United States Patent
Fenton et al.

(10) Patent No.: US 7,499,707 B2
(45) Date of Patent: *Mar. 3, 2009

(54) METHOD AND SYSTEM FOR COMMUNICATING USING A QUIESCENT PERIOD

(75) Inventors: Shaun Richard Fenton, Tadley (GB); Christopher Frank Phillips, Camberley (GB)

(73) Assignee: Motorola, Inc., Schaumburg, IL (US)

( * ) Notice: Subject to any disclaimer, the term of this patent is extended or adjusted under 35 U.S.C. 154(b) by 514 days.

This patent is subject to a terminal disclaimer.

(21) Appl. No.: 10/181,339

(22) PCT Filed: Jan. 18, 2001

(86) PCT No.: PCT/EP01/00618

§ 371 (c)(1),
(2), (4) Date: Oct. 7, 2002

(87) PCT Pub. No.: WO01/54334

PCT Pub. Date: Jul. 26, 2001

(65) Prior Publication Data

US 2003/0109253 A1  Jun. 12, 2003

(30) Foreign Application Priority Data

Jan. 18, 2000 (GB) .................................. 0001071.0

(51) Int. Cl.
*H04Q 7/20* (2006.01)

(52) U.S. Cl. .................. 455/452.2; 455/416; 455/422.1; 455/450; 455/451; 455/453; 455/464; 455/516; 370/260; 370/261; 370/265; 370/319; 370/322; 370/329; 370/341; 370/344; 370/433; 370/528

(58) Field of Classification Search .................. 455/15, 455/414.2, 11.1, 550, 466, 416, 422.1, 516, 455/450, 451, 452.1, 452.2, 453, 464; 370/327, 370/341, 445, 517, 260–261, 265, 319, 322, 370/326, 329, 344, 433, 528
See application file for complete search history.

(56) References Cited

U.S. PATENT DOCUMENTS

| | | | | |
|---|---|---|---|---|
| 3,995,120 | A | * | 11/1976 | Pachynski, Jr. ............. 370/517 |
| 4,093,823 | A | * | 6/1978 | Chu ............................ 370/535 |
| 5,121,385 | A | * | 6/1992 | Tominaga et al. ........... 370/435 |

(Continued)

OTHER PUBLICATIONS

PCT Search Report dated Jun. 27, 2001.

*Primary Examiner*—Stephen M D'Agosta
(74) *Attorney, Agent, or Firm*—Valerie M. Davis

(57) ABSTRACT

In FDMA communications between two or more primary radios (41, 42; 141, 142), use is made of a quiescent period in the primary communication. The quiescent period is used by secondary radios (43, 44; 143, 144) to communicate with each other. The quiescent period may be a transmit interrupt (TI) frame, normally provided in a DIIS protocol in order to permit return signaling from a called radio (43, 44). The secondary radios (43, 44) may signal to each other during the TI frame. Alternatively, the quiescent period may be a gap in channel activity, in which case regulated access telegrams (96) are transmitted by either a calling primary device (141), or a "last to call" primary device (141), or a base station (141), the regulated access telegrams determining a reservation window period during which secondary devices (143, 144) may signal to one another.

15 Claims, 6 Drawing Sheets

U.S. PATENT DOCUMENTS

| | | | |
|---|---|---|---|
| 5,355,366 A * | 10/1994 | Li et al. | 370/528 |
| 5,408,680 A * | 4/1995 | Hattey et al. | 455/15 |
| 5,452,115 A * | 9/1995 | Tomioka | 398/75 |
| 5,455,826 A * | 10/1995 | Ozveren et al. | 370/232 |
| 5,463,620 A * | 10/1995 | Sriram | 370/412 |
| 5,612,955 A * | 3/1997 | Fernandes et al. | 370/433 |
| 5,719,868 A | 2/1998 | Young | |
| 5,754,536 A | 5/1998 | Schmidt | |
| 5,978,384 A * | 11/1999 | Kotchey | 370/445 |
| 6,282,430 B1 * | 8/2001 | Young | |
| 6,377,590 B1 * | 4/2002 | Hoppal et al. | 370/528 |
| 6,388,999 B1 * | 5/2002 | Gorsuch et al. | 370/335 |
| 6,707,910 B1 * | 3/2004 | Valve et al. | 379/388.06 |
| 6,801,754 B2 * | 10/2004 | Talwalkar et al. | 455/15 |
| 7,079,838 B2 * | 7/2006 | Thomas et al. | |

* cited by examiner

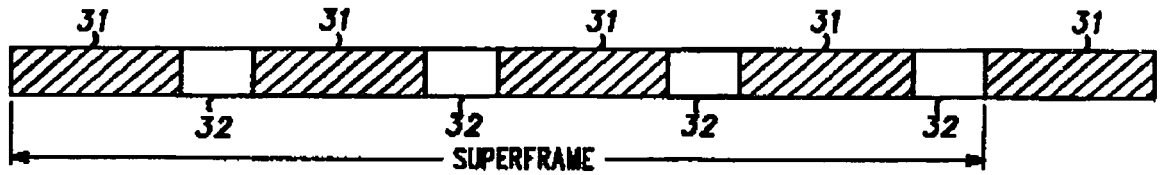
FIG. 3 —PRIOR ART—
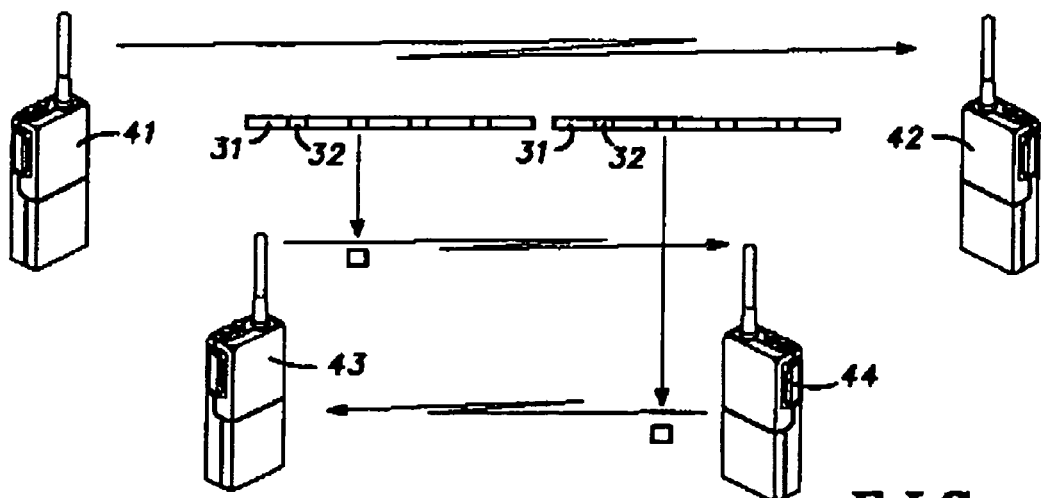
FIG. 4
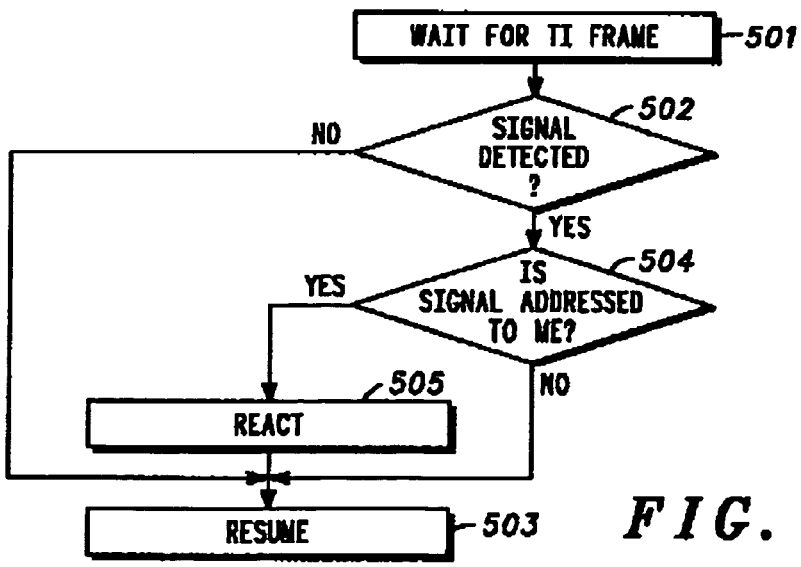
FIG. 5

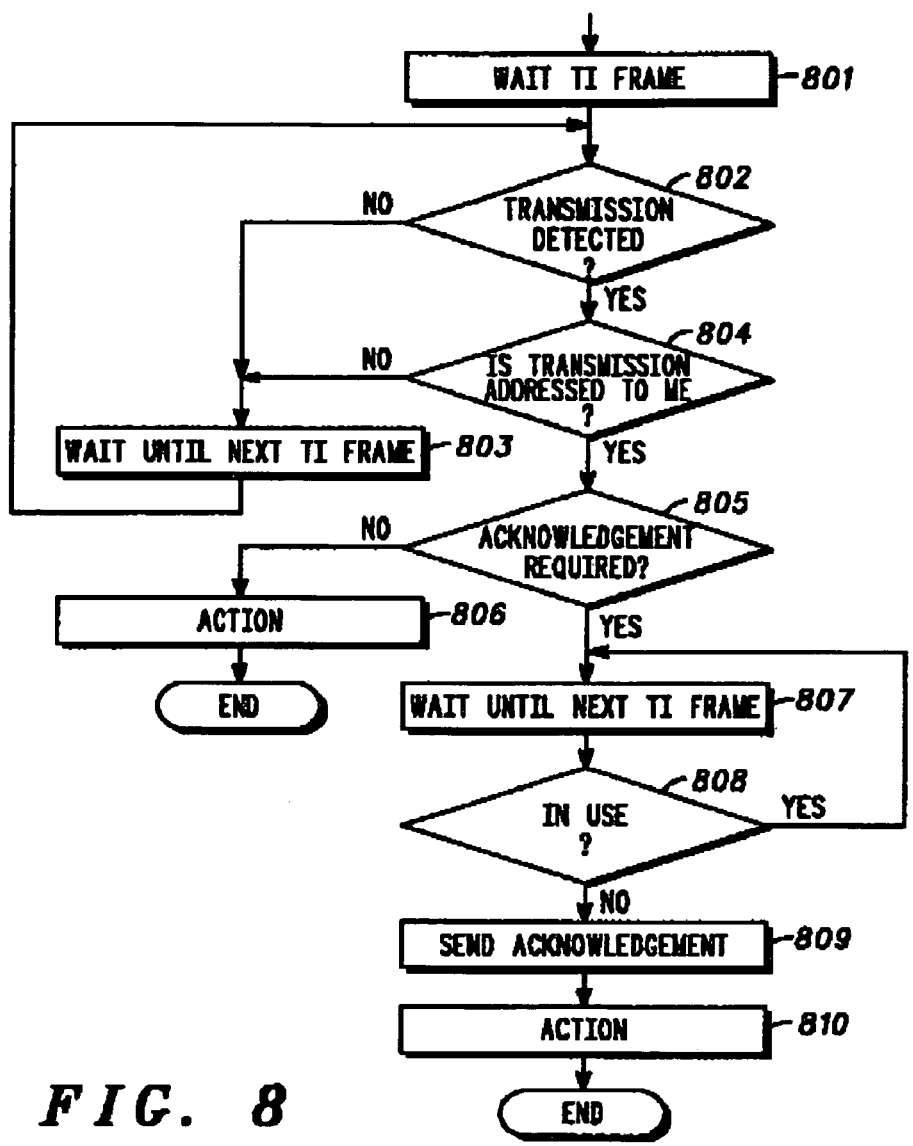
FIG. 8
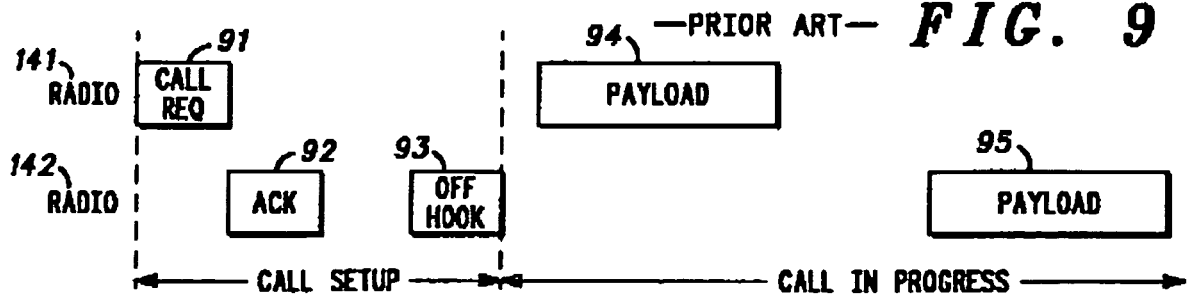
FIG. 9 —PRIOR ART—

METHOD AND SYSTEM FOR COMMUNICATING USING A QUIESCENT PERIOD

This application is the National Stage of and claims the benefit of International Application No. PCT/EP01/00618 filed Jan. 18, 2001, which claims the benefit of Great Britain (GB) International Application No. 0001070.0 filed Jan. 18, 2000, which subsequently issued as GB Patent No. 2358557 on May 8, 2002.

BACKGROUND OF THE INVENTION

1. Field of the Invention

This invention relates to a digital communications system and particular to a frequency division multiplex access (FDMA) communications system.

2. Description of the Related Art

It is known in digital communications systems to utilize digital Time Division Multiplex Access (TDMA) in which, for example, emergency broadcasts adopt a time slot already in use, but this results in data from a calling transmitter previously using the time slots adopted by the emergency broadcast being lost.

In a Digital Interchange of Information and Signaling (DIIS) protocol, which is currently being developed by the European Technical Standards Institute (ETSI), a so-called "super frame" has been devised in which four groups of sixteen slots of payload comprising voice or data is interleaved by three groups of two slots each of signaling frames known as Transmit Interrupt (TI) frames. The TI frame is used so that a transmitting digital communicating device, for example a radio or a base station, periodically returns to a receive mode during the TI frame in order to enable other radios, preferably mobile radios, the opportunity of being able to signal/interrupt the transmitting radio, for example for power control, emergency pre-empt, etc. Although TI frames occur on a regular basis so that a radio wishing to interrupt knows when the TI frame will occur, interrupts are likely to occur infrequently.

It is also known in radio communications for there to be gaps in channel activity, for example between a calling radio receiving an acknowledgement from a called radio and the called radio being taken "off hook", i.e. a user answering the call. There is a further gap when a call is in progress between the called radio being taken off hook and a payload being transmitted by the calling radio. Another gap occurs between a payload transmitted by the calling radio and a payload being transmitted by the called radio and also at the end of transmission by the called radio. The gap between transmission of payload between the calling and called radios is sometimes referred to as an "over" period.

In the prior art it is known to fill these gaps with periodic channel reservation transmissions to indicate that the channel is busy and to prevent third party radios not involved in the call from acquiring the channel for their own purposes. The result quite often is that there are substantial periods of time when radios involved in a call do not have payload to transmit, but at the same time third party radios not involved in the call are waiting to transmit but are locked out and prevented from making transmissions. In a practical example, consider a dispatcher in a taxi service located at a base station who is in communication with a mobile radio in a taxi but who lacks signaling communication from other taxis who may wish to use the communication channel. It is desirable that the dispatcher be able to receive information such as the location of taxis other than the one with whom he is communicating so that the location of those other taxis may be plotted on a display screen, the location being drive by, for example, using a Global Positioning Satellite (GPS) system.

Published U.S. Pat. No. 5,719,868 describes a TDMA slot assignment method. This patent deals with simplex radios operating in self regulating ad hoc configurations and being used to route packet data. A channel contains a cycling TDMA type of frame structure in which each frame consists of multiple slots. If there are 'n' radios, then it appears there must be 'n' frames in the cycle. Slot 0 in each frame is referred to as the broadcast slot. Each radio is assigned its own broadcast slot with which it can allocate itself channel resource and inform its neighbors. A radio allocates itself channel resource by assigning itself specific slots, however, not the broadcast slots. It appears that these slot allocations can either be on the current channel, i.e. the same channel as the broadcast slots, or an alternative channel. The arrangement of U.S. Pat. No. 5,719,868 appears to involve individual radios keeping track of which slots are allocated to other radios, so that when a given radio needs to transmit packet data it can allocate itself unused slots on a given channel, thereby not colliding with other transmissions.

In essence, the arrangement of U.S. Pat. No. 5,719,868 deals with allocating specific slots on a TDMA channel to specific radios so that they can allocate themselves channel resource, thereby minimizing the risks of collision.

U.S. Pat. No. 5,754,536 describes radios operating on a Trunked system, and traffic channels only being allocated for the duration of the speech frames. So whenever a radio detects the presence of speech, it informs the trunking system controller, which then allocates a traffic channel for the duration of the speech frame.

In essence, the arrangement of U.S. Pat. No. 5,754,536 deals with a trunking system controller allocating channel resource to radios only when there is speech to be transmitted.

SUMMARY OF THE INVENTION

An object of this invention is to optimize radio channel usage.

According to a first aspect of this invention there is provided a method of performing Frequency Division Multiplex Access (FDMA) communications including the steps of arranging two or more primary devices to be in two-way primary communication with one another over a signal channel, and performing two-way signaling communication over said channel between two or more secondary devices not involved in same primary communication utilizing a quiescent period in said primary communication.

In one preferred embodiment, a DIIS protocol is used having at least two signaling frames each interleaved between payload frames and each said signaling frame (TI frame) may be used as said quiescent period.

Where plural secondary devices each attempt to transmit in a signaling frame of concern there will be a collision of signaling data. So as to overcome such a difficulty, in a first embodiment in which two secondary devices are to signal to one another, a first secondary device transmits a signal in one signaling frame to a second secondary device and said second secondary device transmits an acknowledgement signal to said first secondary device in a subsequent signaling frame, and if said first secondary device does not receive said acknowledgement signal within a predetermined time then said first secondary device re-transmits said signal in another signaling frame until said acknowledgement signal is received by said first secondary device or until said signal has been transmitted by said first secondary device a predetermined maximum number of times.

In a second embodiment in which two secondary devices are to signal to one another, a first secondary device transmits a signal a predetermined number of times in different signaling frames to a second secondary device.

Advantageously, the signal transmitted by said first secondary device and the acknowledgement signal transmitted by said second secondary device are each one slot in length and said signaling frame is two slots in length.

Conveniently, said slot is 20 ms in length.

In a further preferred embodiment, said quiescent period is a gap in channel activity and regulated access telegrams are transmitted in said gap by one of a calling primary device, a last to call primary device, and a base station for substantially determining a reservation window period for said secondary devices to signal to one another.

Preferably, a calling secondary device determines that the reservation window period is either sufficiently long to enable completion of signaling between secondary devices or that said signaling will be completed within a predetermined maximum time after said reservation window.

According to a second aspect of this invention, there is provided a system of performing Frequency Division Multiplex Access (FDMA) communications including two or more primary devices arranged to be in two-way primary communication with one another over a signal channel, and two or more secondary devices not involved in said primary communication having means arranged to utilize a quiescent period in said primary communication.

In one preferred embodiment, a DIIS protocol is used having at least two signaling frames, each interleaved between payload frames and each said signaling frame may be used as said quiescent period.

Advantageously, a first secondary device has means for transmitting a signal in one signaling frame to a second secondary device and said secondary device has means for transmitting an acknowledgement signal to said first secondary device in a subsequent signaling frame, and if said first secondary device does not receive said acknowledgement signal within a predetermined time, then said first secondary device means for transmitting is arranged to re-transmit said signal in another signaling frame until said acknowledgement signal is received by said first secondary device or until said signal has been transmitted by said first secondary device a predetermined maximum number of times.

Alternatively, a first secondary device has means for transmitting a signal a predetermined number of times in different signaling frames to a second secondary device.

Advantageously, the signal transmitted by the first secondary device and the acknowledgement signal transmitted by the second secondary device are each one slot in length and said signaling frame is two slots in length.

In a further preferred embodiment, said quiescent period is a gap in channel activity and one of a calling primary device, a last to call primary device, and a base station are arranged to transmit regulated access telegrams in said gap, whereby said regulated access telegram determines a reservation window period for said secondary devices to signal to one another.

Preferably, a calling secondary device has means for determining that the reservation window period is either sufficiently long to enable completion of signaling between secondary devices or that said signaling will be completed within a predetermined time after said reservation window.

The present invention improves spectrum efficiency.

BRIEF DESCRIPTION OF THE DRAWINGS

The invention will now be described, by way of example, with reference to the accompanying drawings in which:

FIG. 3 shows, in simplified form, a transmitted digital data stream, FIG. 4 shows a digital communication system in accordance with a first embodiment of this invention, FIG. 5 shows a flow diagram for a first primary device which is transmitting, FIG. 8 shows a flow diagram of the second secondary device, FIG. 9 shows, in schematic form, gaps in channel activity during communication between first and second primary devices.

In the Figures like reference numerals denote like parts.

DESCRIPTION OF THE PREFERRED EMBODIMENTS

Figure 1:
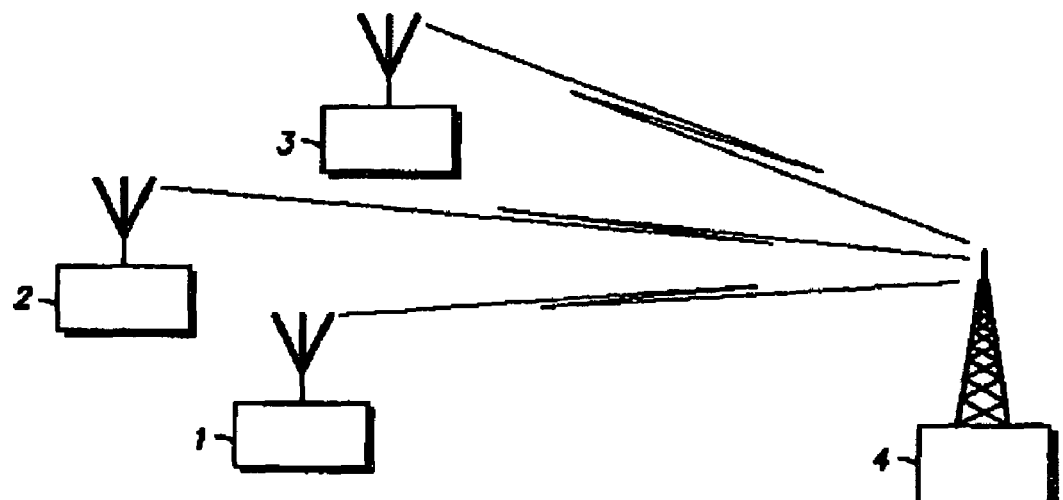
FIG. 1 shows, in schematic form, plural transceivers communicating with a base station.

In FIG. 1, three radio transceivers 1, 2, 3 are arranged to be, selectively, in communication with one another via a base station 4, although it is to be understood that the present invention is not limited to such an arrangement and the transceivers could, if required, be in direct communication with one another.

In a preferred embodiment, the transceivers are mobile or portable radios.

Figure 2:
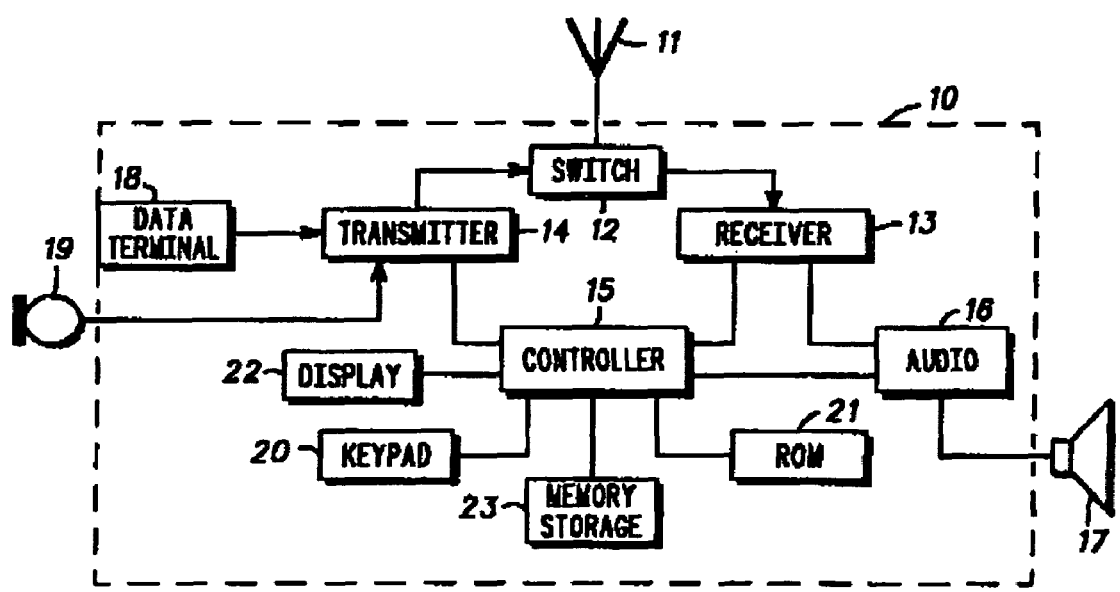
FIG. 2 shows, in block schematic form, a transceiver used in this invention.

Each transceiver 10, shown in FIG. 2, has a transmit and receive antenna 11 connected via an antenna switch 12 selectively to a receiver 13 or a transmitter 14. The receiver 13 and transmitter 14 are connected to a controller 15 arranged to control operation of the transceiver 10. The receiver 13 and controller 15 are each connected to an audio amplifier 16 which provides audio output signals to a loud speaker 17 for aural use by a user. The transmitter 14 is connected to receive input from a data terminal 18 and from a microphone 19. Data terminal 18 is also connected to receiver 13. The connection is not shown in FIG. 2 for simplicity of illustration. Data terminal 18 allows transceiver 10 to receive data via antenna 11, switch 12 and receiver 13.

The controller is connected to a keypad 20 from which a user may input desired parameters such as channel identification (ID) and calling device ID which may be stored in a read-only memory 21. Visual indications of the stored parameters may be displayed on a display device 22. Although not shown in FIG. 2, transceiver 10 may be voice-activated. The user may therefore enter commands by speaking to the radio. This may be instead of, or in addition to, entering commands via keypad 20.

A memory storage device 23 is connected to the controller, the memory storage device having plural memory locations each for storing information in the form of, for example, an address book relating to desired devices that may be called. The read-only memory 21 contains programmed information which will be described hereinbelow relating to the flow charts.

A transmitted digital data stream in accordance with the DIIS protocol is shown in simplified form in FIG. 3 in which there is a super frame formed by four groups each of sixteen slots in lengths of payload 31 comprising voice or data which is interleaved by two slots in length of signaling frames 32. Signaling frames 32 comprise transmit interrupt (TI) frames. Thus, the TI signaling frames occur at precise intervals between payload frames. One slot is 20 ms in length and the super frame is 1.44 seconds in length. In FIG. 3, there are slots of signaling frames for forward channel signaling, channel status and reverse signaling. These are not shown in detail on FIG. 3 for clarity, since the use of such slots is known in the art.

Referring to FIG. 4, a first primary radio 41 is calling, i.e. transmitting, using FDMA to a second primary radio 42 (the called, receiving radio).

In a first preferred embodiment of this invention a first secondary radio 43 wishing to signal to a second secondary radio 44 utilizes an unused TI slot to send a short burst of signaling to the secondary radio 44. Radio 44 responds some time later with a short burst of signaling in another unused TI slot.

Thus, although radios 41 and 42 are in primary communication with one another, by utilizing unused TI slots, other radios may be in secondary communication by signaling to one another. Although in the example shown in FIG. 4, radio 41 is shown transmitting to a single radio 42, radio 41 could be transmitting to a group of radios. Similarly, radio 43, although shown transmitting to a single radio 44, could signal to a group of radios, if desired.

Thus, when radio 43 transmits signaling in an unused TI slot, radios 41 and 42 will determine that the signaling is not addressed to those devices and that the signaling should be ignored while radio 44 receives and processes the signaling.

Considering the previously described example of a mobile communications system used by a taxi service, the radio 43 may be signaling its location to the dispatcher.

Where several secondary radios each attempt to transmit in a TI frame of concern, there will be a collision of signaling data. Therefore, in one embodiment of the invention, if radio 43 is using one of radio 41's TI frames to transmit signaling to radio 44, then radio 44 should use another of radio 41's TI frames to transmit an acknowledgement back to radio 43. If radio 43 receives the acknowledgement, it considers signaling to have been successful. However, if radio 43 does not receive an acknowledgement within a predetermined period of time, then radio 43 selects another of radio 41's TI frames to re-transmit signaling to radio 44. Radio 43 either re-transmits the signaling to radio 44 until it receives an acknowledgement from radio 44, or until radio 43 has re-transmitted the signaling a predetermined maximum number of times. In another embodiment, radio 43 uses one of radio 41's TI frames to transmit signaling to radio 44 or a group of radios, and transmits the signaling a predetermined number of times in different TI frames in the expectation that the signal will be received by radio 44 or the group of radios.

The signal transmitted by radio 43, known as a signaling telegram, is, preferably, one slot in length. A DIIS TI frame, for example, is two slots in length. However, if the radios are sufficiently fast the signaling telegram could, in theory, be almost two slots in length. This is possible if the secondary radio requires relatively little switching time, so that most of the duration of the two slots can be devoted to the useful transmission of signaling telegram. If the signaling regime is slower than in the preferred embodiment however, then the signaling telegram may only be, for example, one third the length of a TI frame. The remainder or the duration of the two time slots would be taken up by the secondary radio switching and sending pre-amble information ahead of the useful signaling.

The radios may be arranged such that radio 43 transmits its signaling to radio 44 in one slot of a pair of consecutive DIIS slots in one DIIS TI frame. Radio 44 would then transmit its acknowledgement in a slot of a later pair of consecutive DIIS slots, i.e. a slot of a later DIIS frame. This is the arrangement currently envisaged. If however radios 43 and 44 can switch sufficiently quickly, and the signaling telegram and acknowledgement are sufficiently short, then radio 43 may transmit its signal in the first slot of a DIIS frame, and radio 44 may send back the acknowledge signal in the second slot of the same DIIS frame.

Although the invention has been described in relation to communication and signaling between mobile radios, it will be understood that the communication and signaling could be between a base station and a mobile radio, or even between two base stations.

The operation of FIG. 4 will now be described with reference to the flow diagrams shown in FIGS. 5-8. Although the flow diagrams are described in relation to the operation of each of the radios 41-44, it will be appreciated that each radio will have the capability of performing all of the functions in the flow diagrams.

Referring to FIG. 5, the radio 41 is assumed to be in transmit mode transmitting a payload interleaved with TI frames and radio 42 has its transmitter OFF and its receiver ON. At step 501 radio 41 listens for a signaling telegram for two slots, i.e. a TI frame. At step 502 it is determined whether or not a signal has been detected. If a signal has not been detected, then radio A resumes payload transmission after the TI frame (step 503). However, if a signal is detected, then at step 504 it is determined whether or not the signal is addressed to radio 41. If the signal is not addressed to radio 41 then the signal is ignored and payload transmission resumed after the TI frame period. However, if the signal is addressed to radio 41, then at step 505 the radio 41 reacts in whatever manner is required before resuming payload transmission (step 503).

Figure 6:
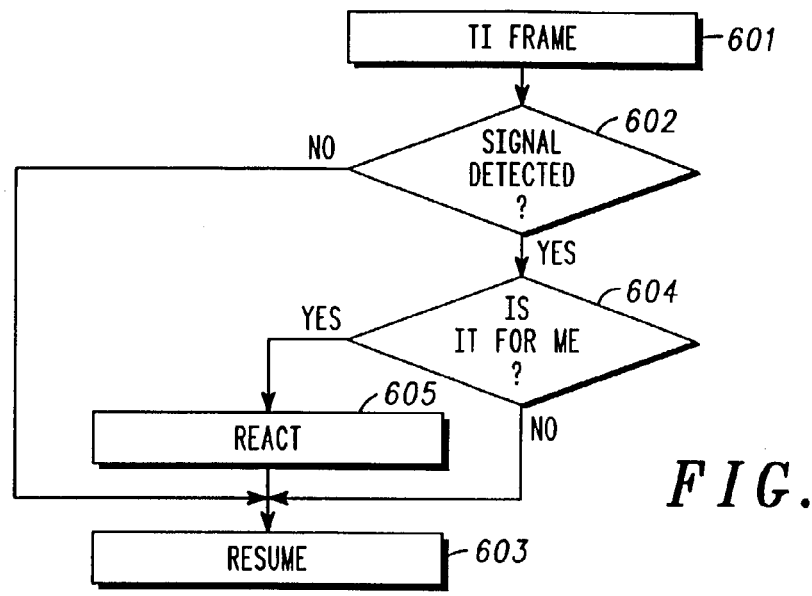
FIG. 6 shows a flow diagram for a second primary device which is receiving transmission from the first primary device.

Referring to FIG. 6, the flow diagram for radio 42 commences with radio 42 in a receive mode receiving payload and expecting TI frames. At step 601 it is determined whether there is a TI frame and if there is then it is determined whether a signal is detected at step 602 and if a signal is not detected then radio 41 resumes listening for payload (step 603). If a signal is detected at step 602, then it is determined (step 604) whether or not the signal is directed to radio 42. If the signal is not directed to radio 42 then the radio resumes listening for payload (step 603). If at step 604 it is determined that the signal is for radio 42, then radio 42 reacts in an appropriate manner (step 605) before commencing listening for payload (step 603).

Figure 7:
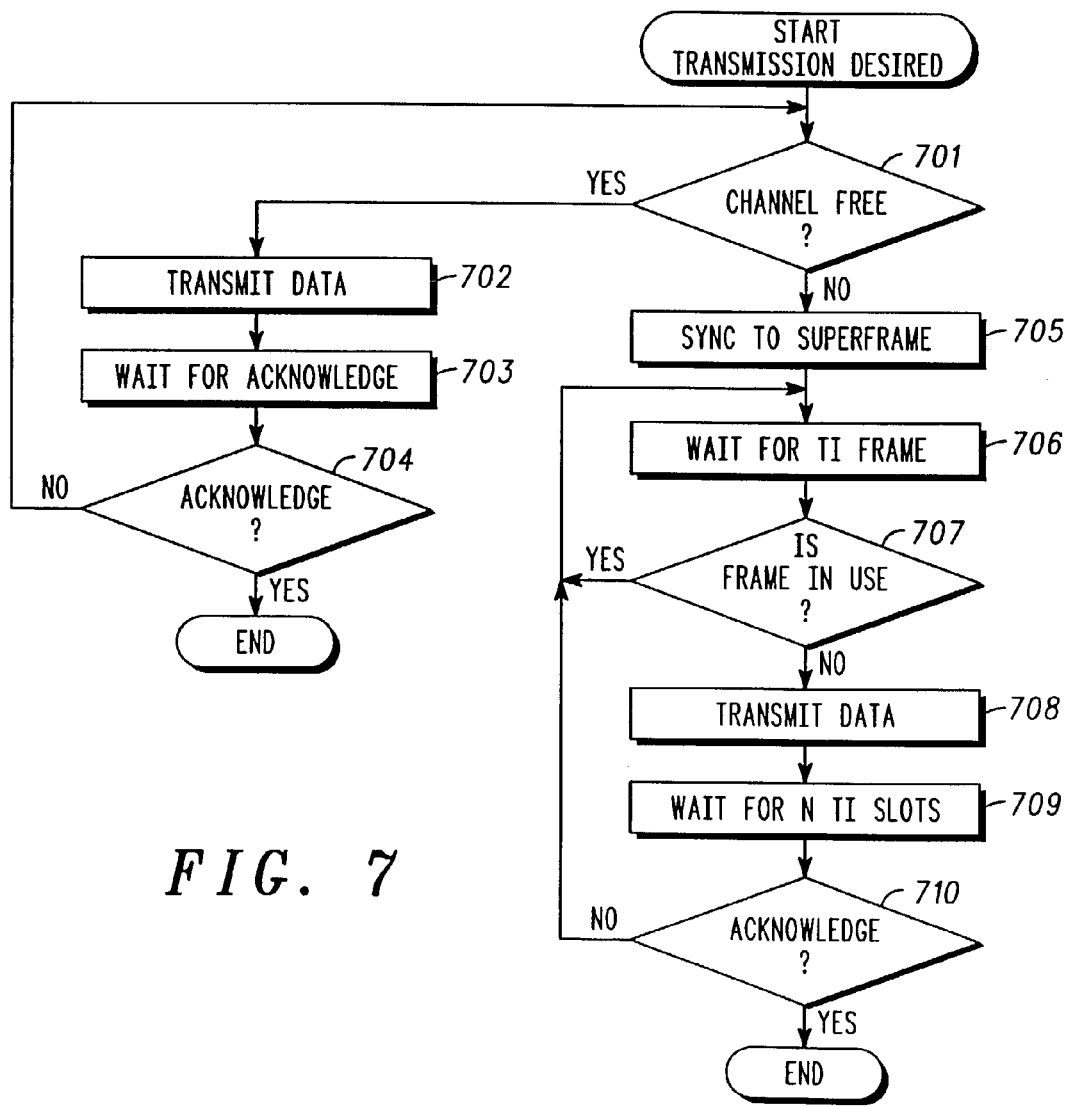
FIG. 7 shows a flow diagram for a first secondary device signaling to a second secondary device.

Referring to FIG. 7, which shows a flow diagram for radio 43, the diagram commences with transmission being desired. It is firstly determined whether a channel is free (step 701)

and, if a channel is free, then a signal in the form of data is transmitted (step 702) and radio 42 then waits for an acknowledgement of receipt of the signal (step 703). If the acknowledgement is received (step 704), then radio 42 terminates transmission, but if the acknowledgement is not received at step 704, then the radio 43 reverts back to step 701. If at step 701 it is determined that a channel is not free, then radio 43 synchronizes to the super frame (step 705) and waits for a TI frame (step 706). At step 707 it is determined whether or not the next available TI frame is in use. If the TI frame is in use, then the process returns to step 706. If, however, a TI frame is not in use, then radio 43 transmits signal data (step 708) and waits for a predetermined number of TI frames (step 709) for an acknowledgement. At step 710 it is determined if there is an acknowledgement, in which event the routine ends, but if there is no acknowledgement the routine reverts back to step 706.

The routine for radio 44 is shown in FIG. 8 in which the radio 44 is in a receive mode in which it is synchronized to and receives super frame addresses to another party, e.g. radio 42. Radio 44 waits for a TI frame (step 801) and at step 802 it is determined whether a signal in the TI frame is detected. If a transmission is not detected, then the radio 44 waits for the next TI frame (step 803). If the transmission is detected at step 802, then the radio 44 determines whether the transmission is addressed to itself (step 804). If the signal is determined to be addressed to the radio 44, then it is determined whether or not an acknowledgement is required (step 805). If an acknowledgement is not required, then the appropriate action is taken (step 806). However, if an acknowledgement is required, then the radio waits until the next or a predetermined subsequent TI frame (step 807) and at step 808 it is determined whether the next or the predetermined subsequent TI frame is in use (step 808). If the TI frame is in use, then the radio 44 waits a maximum of, for example, five subsequent TI frames and the routine reverts to step 807. However, if the TI frame is not in use, then an acknowledgment is sent (step 809) and subsequent action taken as required (step 810).

Thus, with the above described embodiment, TI frames are utilized by secondary devices for signaling to one another.

A further preferred embodiment of the invention will now be described with reference to FIGS. 9-14.

Referring to FIG. 9, a transmission regime is shown schematically in which primary communication is being performed between radios 141 and 142, as above. Radio 141 transmits a call request 91 and radio 142, upon receipt of the call request, transmits an acknowledgement 92. There is then a gap in signaling activity to the time that the user of radio 142 answers the call by the radio 142 being taken "off-hook" 93. The period from radio 141 commencing a call request to radio 142 being off-hook is a call set up signaling period and the period is, typically, about ten seconds. The call is then in progress and payload 94, 95 is transmitted by radios 141 and 142 respectively. There is a gap in signaling activity between radio 142 being off-hook and radio 141 transmitting payload and there is also a gap between payload 94 and payload 95 and, similarly, after transmission of payload 95. The gap between transmission of payloads 94 and 95 is sometimes referred to as an "over" period. It is these gaps in signaling activity that are made use of by the embodiment now to be described. The gaps are quiescent periods in channel activity.

Figure 10:
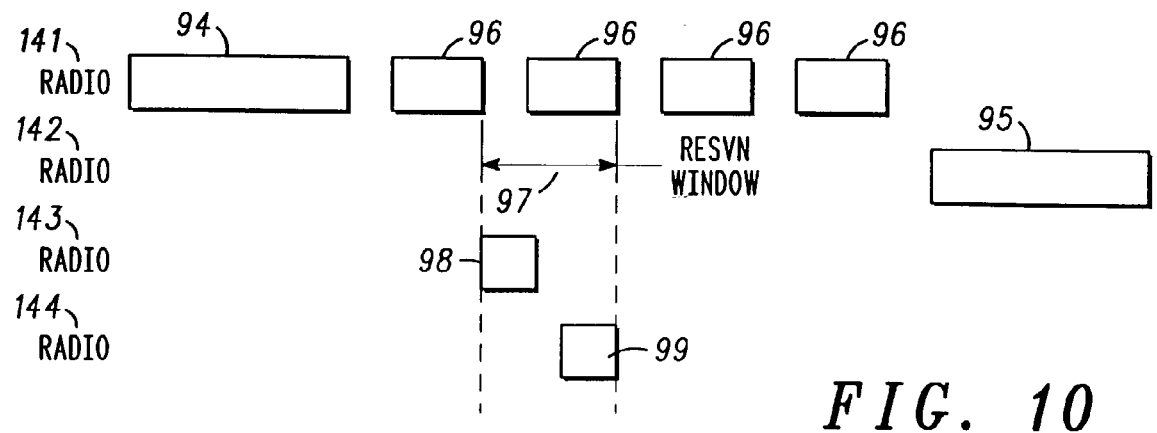
FIG. 10 shows, in schematic form, channel utilization of the gaps in channel activity in accordance with a second embodiment of this invention.

Referring to FIG. 10, where the over period is considered, following payload 94 radio 141 is assumed to take responsibility for regulating channel access during the gaps in channel activity, although the regulation could be performed by radio 142 or a base station for a "base station coordinated" call. Where a call is not in progress, the regulating radio may be the last radio which transmitted a call.

During the gaps in signaling activity the regulating radio transmits periodic Regulated Access telegrams which specify a series of random access time slots. Associated with each random access time slot is mandatory address information and optional restrictions on both the type of communication and channel access duration. All radios requiring to access the channel are obliged to follow the regulated channel access rules which involves choosing a suitably addressed random access time slot and then commencing channel access within that time slot, assuming an earlier time slot has not already been chosen by a different radio. When choosing a given time slot a radio must take note of any associated restrictions on the type of communication and channel access duration.

All random access time slots are, typically, addressed to, and therefore available for, all radios (primary radios) involved in the current call. Also a sub-set of the random access time slots are, typically, addressed to, and therefore available for, third party radios (secondary radios) not involved in the current call. However, since third party channel access will affect the channel access latency for primary radios involved in a call, restrictions are imposed on the type of third party (secondary) communication, e.g. status and packet data only. Channel access duration is also restricted, e.g. to a maximum of 500 ms. Prior to a radio accessing the channel, it must ensure that the duration of the intended channel activity, including any expected acknowledgements, is not to be greater than any restriction imposed on the channel access duration.

Thus, all radios involved in a call will be permitted to access the channel at any time while there is no other channel activity. Also, third party radios not involved in a call (i.e. secondary radios) will, typically, be permitted to access the channel within the specified windows while there is no other channel activity so as to implement short signaling sequences such as status or packet data.

Referring to FIG. 10, where an "over period" is being considered, radio 141 is assumed to be transmitting regulated access telegrams 96, typically each of 20 ms duration. A reservation window 97 is produced for accessing the channel by third party, i.e. secondary, radios 143, 144, the reservation window typically being of the order 100 ms-500 ms. During the reservation window, short bursts of signaling 98, 99 are performed by radios 143 and 144, respectively. It is necessary for the calling secondary radio 143 to determine that the reservation window period is sufficiently long to enable completion of signaling with the radio 144, or that the signaling will be completed within a predetermined maximum time after the reservation window. In this respect, the signaling could extend into the period where payload 95 is to be transmitted. In such an event, the payload 95 could pre-empt the signaling between radios 143 and 144, or payload 95 could be aborted. Another alternative is for the commencement of payload 95 to be delayed to permit signaling between radios 143 and 144 to be completed.

Flow diagrams representative of the routines adopted by the radios will now be described with reference to FIGS. 11-14, although it will be understood that each of the radios may be able to perform all of the routines described.

Figure 11:
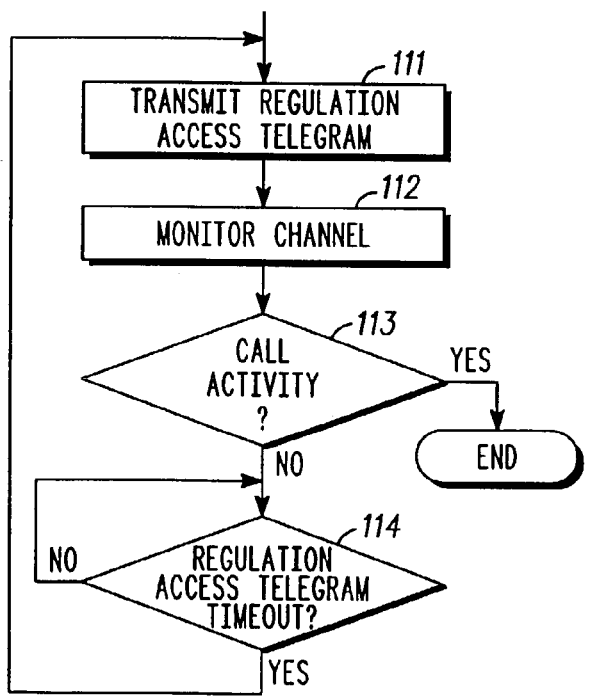
FIG. 11 shows a flow diagram of a primary transmitting device of the second embodiment.

Referring to FIG. 11, radio 141 is commencing regulating activity during a gap and, at step 111, transmits a regulation access telegram defining the reservation window period and whether or not third party access is permitted and, if it is, to which third party. At step 112 the channel is monitored and call activity determined (step 113). If there is channel activity, then the routine terminates. If there is no channel activity, then it is determining (step 114) whether or not the reservation access telegram has "timed-out". If it is has not then the routine continuously monitors the "time-out" period. If the telegram time-out period is exceeded then the routine steps back to step 111.

Figure 12:
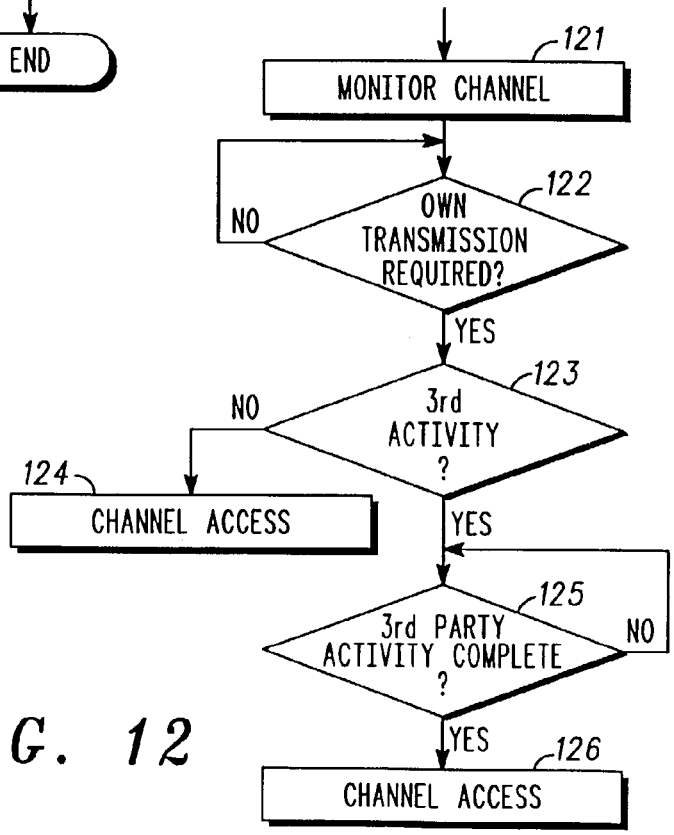
FIG. 12 shows a flow diagram of a second, receiving, primary device of the second embodiment.

Referring to FIG. 12, the routine for radio 142 commences with the radio 142 receiving a regulated access telegram, whereupon the radio monitors the channel at step 121 and determines (step 122) whether or not it needs to transmit a signal. If it does not need to transmit a signal then the routine steps back to step 121, but if radio 142 is required to transmit a signal then, preferably, it is determined at step 123 whether or not there is third party activity and, if there is not, then radio 142 is provided with channel access at step 124. If, on the other hand, there is third party activity, it is determined at step 125 when that activity is complete before radio 142 gains channel access at step 126.

Figure 13:
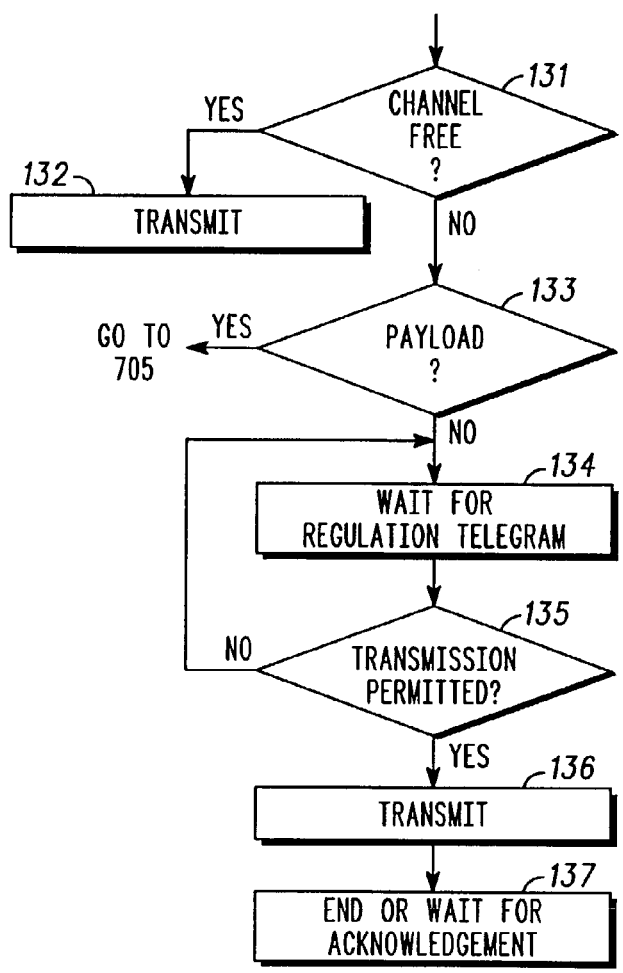
FIG. 13 shows a flow diagram of a first secondary device signaling to a second secondary device in the second embodiment.

The routine for radio 143 will now be described with reference to FIG. 13 commencing with radio 143 beginning to transmit a signal representative, for example, of data.

It is determined whether a channel is free (step 131) and, if it is, then transmission commences (step 132). If a channel is not free then it is determined whether there is payload at step 133 and if there is payload then the routine steps to step 705, see FIG. 7.

If, at step 133, it is determined that there is no payload, then radio 143 waits for a regulation telegram (step 134) and it is then determined at step 135 whether transmission is permitted within the reservation window. If the response is in the negative then the routine reverts to step 134. However, if an affirmative answer is determined, the routine goes to step 136 where transmission is effected and transmission is then terminated or the radio waits for an acknowledgement at step 137.

Figure 14:
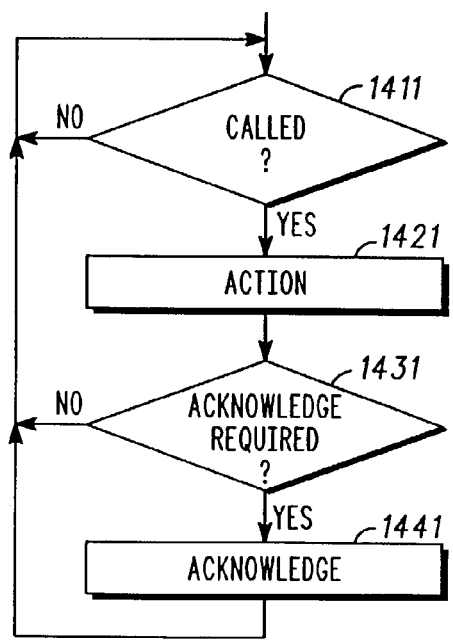
FIG. 14 shows a flow diagram of the second secondary device signaling an acknowledgement to the first secondary device in the second embodiment.

The operation of the radio 144 will now be described with reference to FIG. 14 in which the radio is monitoring the channel.

At step 1411 it is determined whether or not the radio 144 is being called. This function is continuously monitored if it is determined that it is not being called. If the radio 144 is being called then action is taken at step 1421 and radio 144 determines whether an acknowledgement is required, see step 1431. If no acknowledgement is required then the routine reverts to step 1411 or, if an acknowledgement is required, then an acknowledgement is transmitted at step 1441, whereupon the routine, again, reverts to step 1411.

The embodiment of FIGS. 9-14 may be used with the embodiment shown in FIGS. 3-8 or independently thereof.

Comparison with Prior Art Arrangements

The present invention enables unused parts of a channel to be available for other radios to use, e.g. for short packet data transmissions. Radios that employ transmit interrupt frames, i.e. breaks in transmission during which other radios can jump in and interrupt the transmitting radio, can benefit from the invention. If transmit interrupts are fairly infrequent, then this window of opportunity can be used by a 3rd party to transmit a short packet of data to another radio, or group of radios. Additionally, the invention relates to the gaps between speech bursts. These gaps can be made available to 3rd parties, again for the purpose of transmitting short packets of data. Hence the invention can be used to allocate unused parts of a circuit switched channel to other radios for limited transmissions for the purpose of improving channel efficiency.

It is to be understood that the invention has been described with reference to exemplary embodiments, and modifications may be made without departing from the scope of the invention as defined in the appended claims.

The invention claimed is:

1. A method of performing Frequency Division Multiplex Access (FDMA) communications comprising the steps of:
arranging at least two primary devices to be in two-way primary communication with one another over a signal channel; and
performing two-way signaling communication over said channel between at least two secondary devices not involved in same primary communication utilizing a quiescent period in said primary communication.

2. A method as claimed in claim 1, wherein a DIIS protocol is used having at least two signaling frames each interleaved between payload frames and each said signaling frame is used as said quiescent period.

3. A method as claimed in claim 1, wherein: a first secondary device transmits a signal in one signaling frame to a second secondary device and said second secondary device transmits an acknowledgement signal to said first secondary device in a subsequent signaling frame, and if said first secondary device does not receive said acknowledgement signal within a predetermined time, then said first secondary device re-transmits said signal in another signaling frame until said acknowledgement signal is received by said first secondary device or until said signal has been transmitted by said first secondary device a predetermined maximum number times.

4. A method as claimed in claim 1, wherein a first secondary device transmits a signal a predetermined number of times in different signaling frames to a second secondary device.

5. A method as claimed in claim 3, wherein the signal transmitted by said first secondary device and the acknowledgement signal transmitted by said second secondary device are each one slot in length and said signaling frame is two slots in length.

6. A method as claimed in claim 5, wherein said slot is 20 ms in length.

7. A method as claimed in claim 1, wherein said quiescent period is a gap in channel activity and regulated access telegrams are transmitted in said gap by one of a calling primary device, a last to call primary device, and a base station for substantially determining a reservation window period for said secondary devices to signal to one another.

8. A method as claimed in claim 7, wherein a calling secondary device determines that the reservation window period is either sufficiently long to enable completion of signaling between secondary devices or that said signaling will be completed within a predetermined maximum time after said reservation window.

9. A system performing Frequency Division Multiplex Access (FDMA) communications comprising:
at least two primary devices arranged to be in two-way primary communication with one another over a signal channel;
and at least two secondary devices not involved in said primary communication having means ranged to utilize a quiescent period in said primary communication.

10. A system as claimed in claim 9, wherein a DIIS protocol is used having at least two signaling frames, each interleaved between payload frames and each said signaling frame is used as said quiescent period.

11. A system as claimed in claim 9, wherein a first secondary device has means for transmitting a signal in one signaling frame to a second secondary device, and said secondary device hats means for transmitting an acknowledgement signal to said first secondary device in a subsequent signaling frame, and if said first secondary device does not receive said acknowledgement signal within a predetermined tine, then said first secondary device means for transmitting is arranged to re-transmit said signal in another signaling frame until said acknowledgement signal is received by said first secondary device or until said signal has been transmitted by said first secondary device a predetermined maximum number of times.

12. A system as claimed in claim 9, wherein a first secondary device has means for transmitting a signal a predetermined number of times in different signaling frames to a second secondary device.

13. A system as claimed in claim 9, wherein the signal transmitted by the first secondary device and the acknowledgement signal transmitted by the second secondary device are each one slot in length and said signaling frame is two slots in length.

14. A system as claimed in claim 9, wherein said quiescent period is a gap in channel activity and one of a calling primary device, a last to call primary device, and a base station are arranged to transmit regulated access telegrams in said gap, whereby said regulated access telegram determines a reservation window period for said secondary devices to signal to one another.

15. A system as claimed in claim 9, wherein a calling secondary device has means for determining that the reservation window period is either sufficiently long to enable completion of signaling between secondary devices or that said signaling will be completed within a predetermined time after said reservation window.

* * * * *